Figure 1:
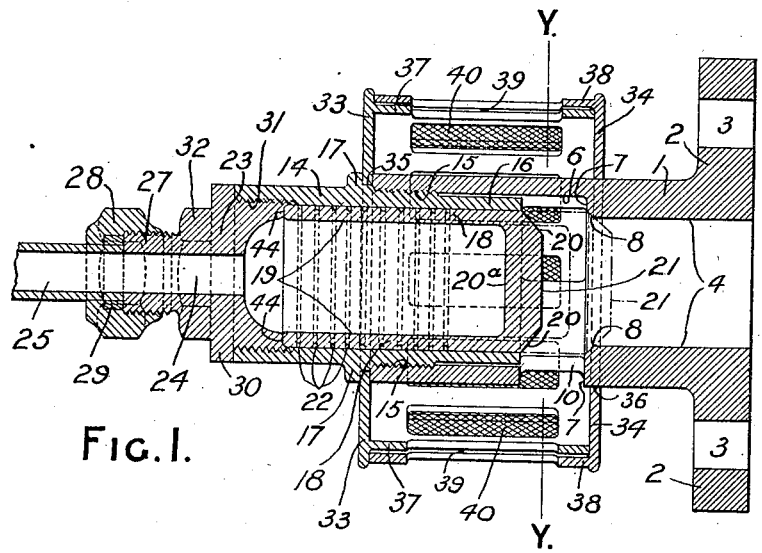

J. G. ROBINSON.
PRESSURE RELEASE VALVE.
APPLICATION FILED MAR. 18, 1912.

1,035,238.

Patented Aug. 13, 1912.
3 SHEETS—SHEET 1.

Witnesses:
S. H. Davis.
W. L. Burch.

Inventor.
John G. Robinson
by Hubert W. Jenner
Attorney.

J. G. ROBINSON.
PRESSURE RELEASE VALVE.
APPLICATION FILED MAR. 18, 1912.

1,035,238.

Patented Aug. 13, 1912.

3 SHEETS—SHEET 2.

J. G. ROBINSON.
PRESSURE RELEASE VALVE.
APPLICATION FILED MAR. 18, 1912.

1,035,238.

Patented Aug. 13, 1912.

3 SHEETS—SHEET 3.

UNITED STATES PATENT OFFICE.

JOHN GEORGE ROBINSON, OF MANCHESTER, ENGLAND.

PRESSURE-RELEASE VALVE.

1,035,238.  Specification of Letters Patent.  Patented Aug. 13, 1912.

Application filed March 18, 1912. Serial No. 684,613.

*To all whom it may concern:*

Be it known that I, JOHN GEORGE ROBINSON, a subject of the King of Great Britain and Ireland, residing at Manchester, in the county of Lancaster, England, (whose post-office address is "Boothdale," Fairfield, Manchester, in the county of Lancaster, England,) have invented a certain new and useful Improved Pressure-Release Valve for Use in Connection with Locomotive and other Steam Engines; and I do hereby declare the following to be a full, clear, and exact description of the invention, such as will enable others skilled in the art to which it appertains to make and use the same.

This invention relates to valve apparatus for use in connection with locomotive and other steam engines.

It is well known that engines fitted with non-collapsible piston valves are liable when running without steam, to set up serious knocking at the connecting rod ends or brasses due to the sudden release of considerable pressure set up in the cylinder between the piston and the cylinder cover. Further, with various types of piston valves, undue pressure is set up in the cylinders due to priming, the pressure in the cylinders exceeding that in the cylinder steam chests.

The principal object of this invention is to provide means whereby any pressure or compression that arises between the piston and the cylinder cover, when the engine is running without steam, will be immediately released thus avoiding the objectionable knocking before mentioned.

Further the valve according to this invention is such that it acts, when the engine is running with steam, to automatically release any excess of pressure above that in the steam chests, arising through priming or other causes.

Further, the valve according to this invention is so constructed and arranged that it acts as an air inlet and outlet valve to and from the cylinders when the engine is running without steam and thus releases any pressure and destroys any vacuum that may be set up between the cylinder cover and the piston.

Further a valve according to this invention consists of a cylindrical valve casing (which is adapted to be secured to the cylinder cover by bolts or the like or it might be screwed into the cylinder cover), having a hole or port through its inner end which registers with a corresponding hole or port in the cylinder cover. This valve casing comprises a cylinder, a port or hole in the end of the said cylinder being connected to a steam supply preferably the engine cylinder steam chest. Suitable relief or exhaust ports are provided in the valve casing. Adapted to work in the said cylinder and valve casing is a piston, which is preferably hollow throughout the greater portion of its length, the inner closed or solid end of the said piston forming a valve which is adapted to seat upon a valve seating provided in the valve casing at the outer end of the above mentioned port in the inner end of the valve casing. The extreme end or face of the solid or valve portion of the above mentioned piston is of slightly less area than the area of the outer surfaces of the said piston which are acted upon by the steam from the steam chest, so that the valve portion is returned on to its seat, when steam is admitted through the port in the outer end of the valve cylinder, by reason of the steam having a slightly larger area to act upon than the pressure area provided on the inner end or valve portion of the piston. By this means the valve is kept closed until undue pressure is set up as before mentioned when the piston, comprising the valve, will be forced off its seat and the pressure will thus be released. When the engine is running without steam the valve will also be forced off its seat when any compression arises in the engine cylinder and will remain off its seat (until steam is again applied to the engines) thus acting to break any vacuum that would otherwise obtain.

An exhaust silencing and dirt excluding casing may also be provided upon the valve as hereinafter described.

In order that the invention may be more fully understood reference is made to the accompanying drawings in which,—

Figure 2:
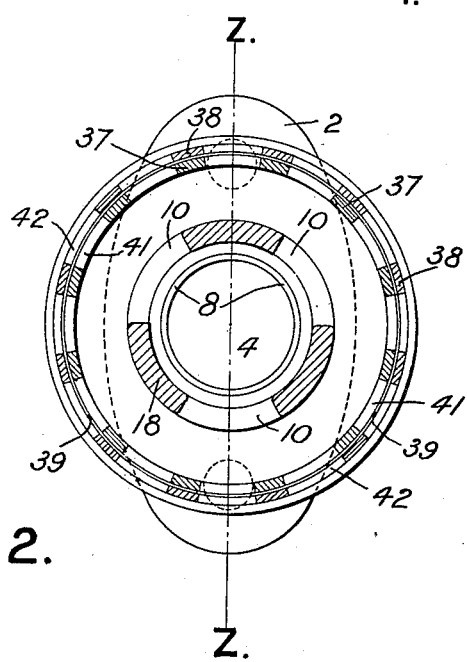
Figure 3:
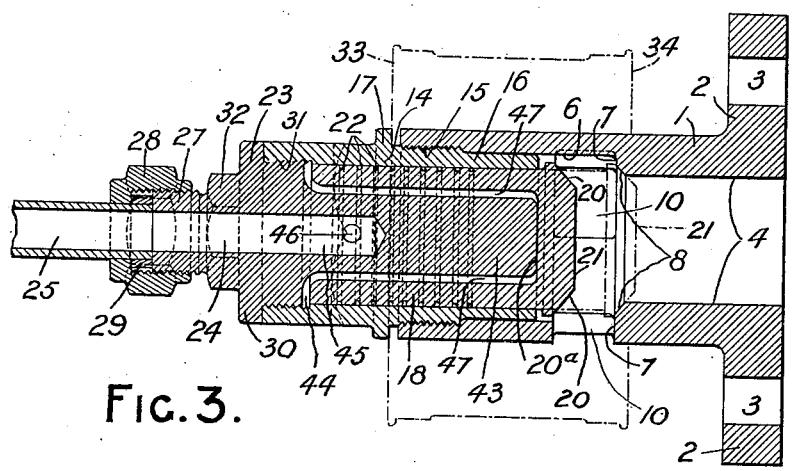
Figure 4:
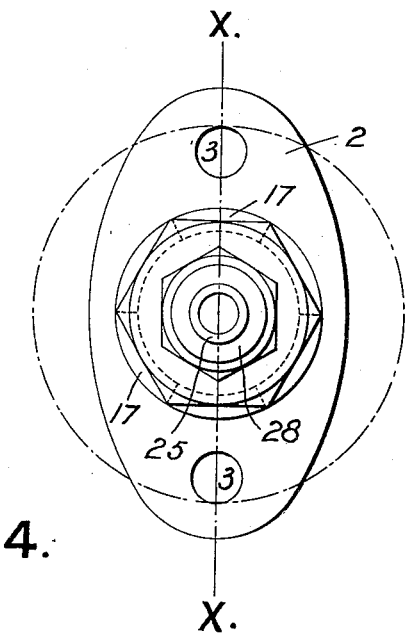
Figure 5:
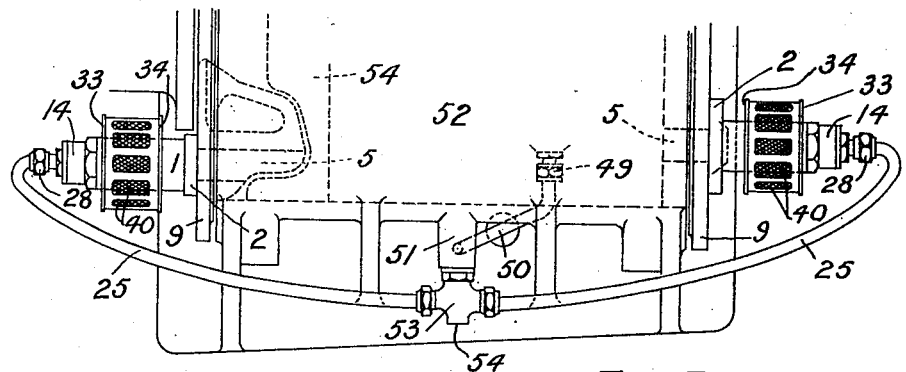
Figure 6:
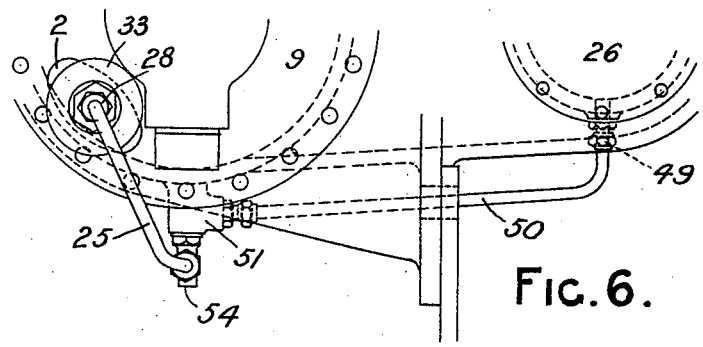
Figure 7:
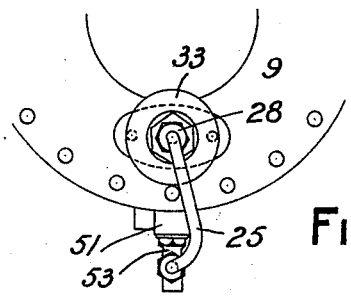

Figure 1 is a sectional elevation of one form of the valve, taken on the line Z. Z. Fig. 2. Fig. 2 is a transverse section taken on the line Y. Y. Fig. 1. Fig. 3 is a sectional elevation of an alternative form of valve, taken on the line X. X. Fig. 4. Fig. 4 is an end view of the valves shown in Figs. 1 and 3. Figs. 5, 6 and 7 show side and end elevations of the valves arranged on the engine cylinders.

Like reference symbols refer to corresponding parts in the several figures of the drawings.

Referring to Figs. 1, 2, 4, 5, 6, and 7, 1 is the valve casing which is provided with a suitable flange 2 in which suitable holes 3 are provided for securing, by means of bolts or the like, the said valve casing 1 to the cylinder cover. If desired the said flange might be omitted and the casing 1 screwed into the cylinder cover. The valve casing 1 is bored at 4 such bore extending rather less than half the length of the casing 1, the said bore 4 being of a diameter to correspond with a hole or port 5 in the cylinder cover. The valve casing 1 is also bored at 6 which bore 6 is of a suitably larger diameter than the bore 4, and extends from the outer end of the casing 1 to the before mentioned bore 4. At the shoulder 7 formed in the metal by the meeting of these two bores 4, 6 a beveled valve seating 8 is provided. 10, 10, 10 are suitable pressure relief or exhaust ports provided in the valve casing 1, these ports 10 also when the valve 20 is off its seat 8, providing for the admission of air to and its escape from the cylinder. 14 is a cylinder threaded at 15 so as to screw into a correspondingly screwed portion of the valve casing 1, and having a reduced portion 16 which projects into the bore 6 of the valve casing 1. The said cylinder has formed upon it a shoulder 17 which is preferably of the same diameter as the valve casing 1. 18 is a piston bored at 19 for the greater part of its length the inner or solid end of said piston 18 being suitably beveled at 20 so as to form a valve which seats upon the seating 8 provided in the valve casing 1. In the example shown the beforementioned bore 19 is of a slightly larger diameter than the bore 4 and the face 21 of the valve portion or solid end of the piston 18. 22 are water packing grooves usually employed in this type of piston. 23 is a suitable end piece which is screwed into the outer end of the cylinder 14. The said end piece 23 is bored at 24 the said bore 24 being connected by means of a pipe 25 to the steam supply which, in the example shown, is the cylinder steam chest 26. The said pipe 25 is connected to a screwed portion 27 of the beforementioned end piece 23 by means of a union nut 28 which engages with a collar 29 affixed to the end of the pipe 25. The before mentioned end piece 23 is formed with a collar or flange 30 which, when the screwed portion 31 is screwed home in the cylinder 14, rests upon the end of the said cylinder 14. On the outer side of the aforesaid collar 30 means are provided by which the said end piece 23 can be screwed into and tightened in the cylinder 14. In the example shown this takes the form of hexagonal shaping 32. 33 and 34 are the casing portions of a suitable dirt excluder and exhaust silencer which may be provided. The said casings 33 and 34 are, as shown, cylindrically formed, one end of each being open and the other end being closed except for suitable diameter holes 35 and 36 which fit around the valve body 1. The tubular portion 37 of the casing 33 is of a diameter to loosely fit within the tubular portion 38 of the casing 34 so as to leave a space 39 into which suitable wire gauze 40 of a fine mesh is placed. 41 and 42 are openings cut in the tubular portions 37 and 38 of the casing. When the wire gauze 40 is placed in position the two portions of the casing are suitably secured together. The complete dirt excluding and silencing casing is mounted upon the valve casing 1 the bore 36 of the portion 34 being passed over the valve casing 1 until the end portion 33 of the casing rests upon the outer end of the valve casing 1. The cylinder 14 is then screwed into the valve casing 1 until the shouldered portion 17 is tight upon the aforesaid end portion 33 and the complete dirt excluding casing is thus held securely in position.

Referring to Figs. 3 and 4 it will be seen that the hereinbefore mentioned end portion 23 is provided with an inwardly projecting piece or stem 43 so that when the piston 18 is in its full open position, i. e. the valve portion 20 is farthest away from its seat, the inner end of the said projecting piece or stem 43 abuts the outer face 20$^a$ of the solid or valve portion of the piston. By this means the outer end face 44 of the piston valve is prevented from knocking or pounding against the inner screwed portion 31 of the end piece 23. To provide for the admission of steam to the inside of the piston 18 the bore 24 of the end piece 23 is extended, as at 45, into the projecting piece or stem 43. Holes 46 are then drilled diametrically across the said projecting portion 43 such holes 46 communicating with the extended bore 45. The steam passes through the aforesaid holes 46 into an annular space 47 provided between the inside of the piston 18 and the outside of the projecting portion or stem 43 and from the said annular space 47 the steam is directed against the solid end or valve portion and the outer end face 44 of the piston.

It will be understood that one of the valves above described is fitted to each end or cover 9 of the engine cylinders and connected with the cylinder steam chest 48. In the example shown (Figs. 5, 6 and 7) a suitable union 49 is provided on the steam chest 26 and a pipe 50 led from the said union 49 to an embossation or projection 51 provided on the cylinder 52. A hollow passage leads from the said projection 51 to a cross piece 53 (or it might be a T piece) and from the said cross piece 53 pipes 25 are led to the outer ends of the pressure release valves above described.

A drain cock may be fitted to the lower branch 54 of the cross piece 53 so as to run off any accumulation of moisture that may obtain.

When the apparatus is in use and the locomotive or like engine to which it is applied is running under steam the piston 18 is held upon the valve seating 8 by reason of the steam acting upon a slightly larger area, i. e. the surfaces 20ª and 44 of the piston 18, than is provided by the valve face 21. Should however undue pressure arise between the engine piston 54 and the cylinder cover 9 the extra pressure on the valve face 21 will overcome the pressure on the outer faces 20ª, 44 of the piston 18 and move the said piston away from its seat 8 and so release the pressure which escapes through the hereinbefore mentioned exhaust ports 10 in the valve casing and when the said pressure has been relieved the piston valve will again be forced on to its seat as before described.

When the engine is running without steam the compression of air between the piston 54 (see Fig. 5) and the cylinder cover 9 moves the valve piston off its seat 8 and releases the air through the exhaust ports 10. Owing to the partial vacuum created in the steam chest and in the outer end of the valve cylinder 14, by the movements of the engine piston 54 in the engine cylinder, and the pressure of the atmosphere on the valve face 21 the valve piston 18 is moved farther away from its seat and is thus held until steam is again admitted to the steam chest when it acts on the valve piston 18 and closes the valve again on to its seat 8.

As there is very little difference, say about 10% between the areas of the outer faces 20ª and 44 of the piston 18 and of the valve face 21, it is obvious that a relatively small rise in the cylinder pressure over that in the steam chest will suffice to open the valve and relieve the excess cylinder pressure. Suppose the difference be 10% then the valve will lift with 200 lbs. per square inch cylinder pressure and 180 lbs. steam chest pressure or with 100 lbs. and 90 lbs. and so on. The valve therefore acts as a water relief or priming valve in addition to its other two functions.

It will be seen that the opening of the valve when steam is shut off provides a free inlet and outlet for air to and from the engine cylinder.

A valve according to this invention is entirely automatic in action and in addition to automaticaly relieve compression set up between the engine piston and the cylinder cover it also performs the functions of the usual steam chest air valve and of the large by-pass ports and valve which are usually fitted when non-collapsible piston valves are used. It will also be understood that a valve according to this invention may be so constructed and arranged as to work at and above any predetermined degree of pressure existing or set up in the engine cylinder when the engine is running without steam, and at and above any predetermined degree of pressure in excess of the steam pressure in the steam chest when the engine is running with steam on, thus overcoming the disadvantages obtaining in spring relief valves commonly employed, the latter being set to open at a definite cylinder pressure no matter what the steam chest pressure may be. From the foregoing it is evident that a valve according to this invention replaces three separate fittings, heretofore usually employed, viz., steam chest air valve, by-pass ports and cock, and priming valve or pressure relief valve.

Of the two forms of construction of valve according to this invention, shown in the drawings, that illustrated in Figs. 3 and 4 is considered preferably.

What I claim as my invention, and desire to secure by Letters Patent is:—

1. In a relief valve, the combination, with a casing provided with a cylindrical chamber having a lateral opening, said casing having also a passage for communicating with the engine cylinder, and a valve-seat between the said passage and chamber; of a removable cylinder secured in the outer end portion of the said casing with its inner end portion projecting therein and provided at its outer end portion with a connected pressure supply pipe, and a piston valve of greater area than the said passage, said piston valve being slidable in the said cylinder and normally bearing on the said valve-seat.

2. In a relief valve, the combination, with a casing provided with a cylindrical chamber having a lateral opening, said casing having also a passage for communicating with the engine cylinder, and a valve-seat between the said passage and chamber; of a cylinder secured in the outer end portion of the said casing and provided with a connected pressure supply pipe and having also an inwardly projecting valve stop at its axis, and a hollow piston valve of greater area than the said passage, said piston valve being slidable in the said cylinder over the said valve stop and normally bearing on the said valve-seat.

3. In a relief valve, the combination, with a casing provided with a cylindrical chamber having a lateral opening, said casing having also a passage for communicating with the engine cylinder, and a valve-seat between the said passage and chamber; of a cylinder provided with an external flange and secured in the outer end portion of the said casing and provided at its outer end portion with a connected pressure supply pipe, a dirt guard inclosing the lateral opening of the said chamber and having a plate at its outer end which is clamped between the said flange and the outer end of the casing, and a piston valve of greater area than the said passage, said piston valve being slidable in the said cylinder and normally bearing on the said valve-seat.

In testimony whereof I affix my signature, in presence of two witnesses.

JOHN GEORGE ROBINSON.

Witnesses:
G. R. SMITH,
W. H. SIMSON.